(12) United States Patent
Ambrose

(10) Patent No.: US 7,778,399 B2
(45) Date of Patent: Aug. 17, 2010

(54) SYSTEM AND METHOD FOR REAL-TIME CALL LOG STATUS

(75) Inventor: Toby R. Ambrose, Tempe, AZ (US)

(73) Assignee: Inter-Tel, Inc, Tempe, AZ (US)

( * ) Notice: Subject to any disclaimer, the term of this patent is extended or adjusted under 35 U.S.C. 154(b) by 1395 days.

(21) Appl. No.: 10/884,416

(22) Filed: Jul. 2, 2004

(65) Prior Publication Data

US 2006/0002536 A1   Jan. 5, 2006

(51) Int. Cl.
*H04M 1/56*   (2006.01)
*H04M 15/06*   (2006.01)

(52) U.S. Cl. .............................. 379/142.01; 379/142.11; 379/142.17

(58) Field of Classification Search ............. 379/142.01, 379/142.11, 142.17
See application file for complete search history.

(56) References Cited

U.S. PATENT DOCUMENTS

| | | | |
|---|---|---|---|
| 4,304,968 A | | 12/1981 | Klausner et al. |
| 4,924,496 A | | 5/1990 | Figa et al. |
| 5,737,395 A | * | 4/1998 | Irribarren .................. 379/88.13 |
| 5,974,388 A | | 10/1999 | Durham |
| 6,178,450 B1 | * | 1/2001 | Ogishi et al. ................. 709/224 |
| 6,754,323 B1 | * | 6/2004 | Chang et al. ........... 379/205.01 |
| 7,315,614 B2 | * | 1/2008 | Bedingfield et al. .... 379/142.07 |
| 2002/0130904 A1 | * | 9/2002 | Becker et al. ................ 345/753 |
| 2003/0064712 A1 | * | 4/2003 | Gaston et al. ................ 455/414 |
| 2006/0129643 A1 | * | 6/2006 | Nielson et al. ............... 709/206 |

* cited by examiner

*Primary Examiner*—Quynh H Nguyen
(74) *Attorney, Agent, or Firm*—Michelle Whittington

(57) ABSTRACT

A system and method for real-time call log status includes a call log database of call records representing transpired communication events. The call log is displayed for the user and includes a status indicator for each of the events. The status indicator may be an icon, a description, a pop-up window, a pop-up menu or any other indication that informs the user of the real-time status of the name/number associated with the displayed event. In this manner, the user is able to determine, at a glance, whether the name/number is available to participate in an impending communication event.

14 Claims, 6 Drawing Sheets

CALL LOG

| DATE/TIME | NAME/NUMBER | RESULT |
|---|---|---|
| 06/17 03:41 PM | JILL BLACK x123 | UNANSWERED |
| 06/17 01:22 PM | TOM NEIL x309 | ANSWERED |
| 06/17 01:20:42 PM | PRESENTED | |
| 06/17 01:20:42 PM | CALLING | x309 |
| 06/17 01:20:44 PM | CONNECTED | x291 |
| 06/17 01:22:50 PM | TERMINATED | |
| 06/17 11:01 AM | DONNA FITZ (603)555- | VOICE MAIL |
| 06/17 09:14 AM | x867 | MISSED |
| 06/17 07:33 AM | (101)555-3101 | VOICE MAIL |

✗ REMOVE ENTRY    ADD TO ADDRESS BOOK

CALL LOG

| | DATE/TIME | NAME/NUMBER | RESULT |
|---|---|---|---|
| + | 06/17 03:41 PM | ✉ JILL BLACK x123 | UNANSWERED |
| + | 06/17 01:22 PM | 📵 TOM NEIL x309 | ANSWERED |
| + | 06/17 11:01 AM | ? DONNA FITZ (603) | ON VAC. 'TIL MONDAY |
| + | 06/17 09:14 AM | ✉ x867 | |
| + | 06/17 07:33 AM | ☎ (101)555-3101 | |
| + | 06/16 08:15 PM | 📵 JOHN SILVER | |
| + | 06/16 04:04 PM | ☎ (101)555-3101 | |
| + | 06/16 02:12 PM | ✉ x404 | TO x405 |
| + | 06/16 12:51 PM | 🏠 HOME | ANSWERED |

Popup menu (500):
- FIND ME
- LEAVE MESSAGE
- WORK △
- HOME △
- VOICEMAIL
- CANCEL Tooltip:
- DEVICE: x309
- PRIMARY: x309
- OTHER: x309
- MOBILE: (180) 555-2279

✗ REMOVE ENTRY    📇 ADD TO ADDRESS BOOK

Fig. 5

SYSTEM AND METHOD FOR REAL-TIME CALL LOG STATUS

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

FIELD OF INVENTION

The present invention relates generally to a system and method for call log status and, in particular, to a system and method for real-time status of a call log entry.

BACKGROUND OF THE INVENTION

Presence management is a mechanism that often monitors, updates and makes available a particular user's location and/or availability to other users for communication purposes. There are several systems and methods for presence management, for example, systems which allow the user to direct communication to a particular location, and systems that spontaneously notify others of the user's location. For example, one of the earliest systems allowed a user to key-in a forwarding number on a device to automatically route incoming calls from the device to the keyed-in number. Another option for the user is to key-in a message notifying incoming callers of the user's whereabouts, such that the message appears on a display of the caller's device. Other systems, such as Microsoft® Netmeeting®, automatically transmit a notification to others announcing that the user has logged in to the system and is now available for communications.

Another valuable communication tool involves maintaining a record or log of communication events. For example, many communication devices and systems include an "incoming" and "outgoing" call log of numbers so the user can view recent communication events. In a similar manner, the user may also view a "missed" call log indicative of incoming calls that the user did not respond to. The user is generally able to select an entry on any of the call logs and place an immediate call to the displayed number.

One drawback associated with the present call log systems is the inability to provide presence management for the entered numbers and/or callers. For instance, when a user selects an entry on a call log to place a call to the listed number, the user is unaware of the recipient's availability to receive the call. Typically, the user must proceed with placing the call and then wait to see if the recipient is able to answer the call, currently on a call, out of the office, or otherwise unavailable. Thus, it would be desirable to include real-time presence management with call log systems. In particular, a system is needed to provide real-time status of call log entries such that a user has current status information of the recipient prior to initiating communication.

SUMMARY OF THE INVENTION

In one embodiment of a communications call log, the system includes an address book database of stored names and contact numbers, and a call log database of call records representing transpired communication events. A displayable call log includes one or more entries, which each entry displaying data pertaining to a call record. The displayed data includes the stored names and numbers from the address book database if the transpired communication event matches one of the database entries. A status indicator is displayed for each entry on the call to represent the real-time availability of the entry to participate in an impending communication event.

In one particular embodiment, the status indicator is a graphical icon, a pop-up window, a pop-up menu, or any combination thereof.

One embodiment of a communications call log process includes recording data pertaining to a transpired communication event, including a number. A call log is displayed which includes one or more of the transpired communication events. A real-time availability of the number, for the displayed communication events, to participate in an impending communication event is determined, and a status indicator to represent the availability is displayed.

BRIEF DESCRIPTION OF THE DRAWINGS

These and other features, aspects, and advantages of the disclosure may be best understood by reference to the following description taken in conjunction with the accompanying drawings, wherein like reference numerals indicate similar elements:

FIGS. 2-5 illustrate exemplary call logs in accordance with various embodiments of a real-time call log status system.

DETAILED DESCRIPTION

The system and method for call log status provides real-time status of entries in a user's call log. The entries typically include names and/or numbers of recently called people and/or numbers, as well as the people and/or numbers that have recently called the user or the user's endpoint device. Each entry is a distinctive communication event and may appear on the call log as a separate line item, even if multiple communications are made to the same name/number. The illustrative embodiments disclosed herein relate to an office setting having one or more users associated with one or more endpoints in a networked system. Although conveniently disclosed in this manner, it should be recognized that the particular embodiments have usefulness outside an office-type setting. The particular details of a real-time call log status system and methods will follow to include a best mode.

Figure 1:
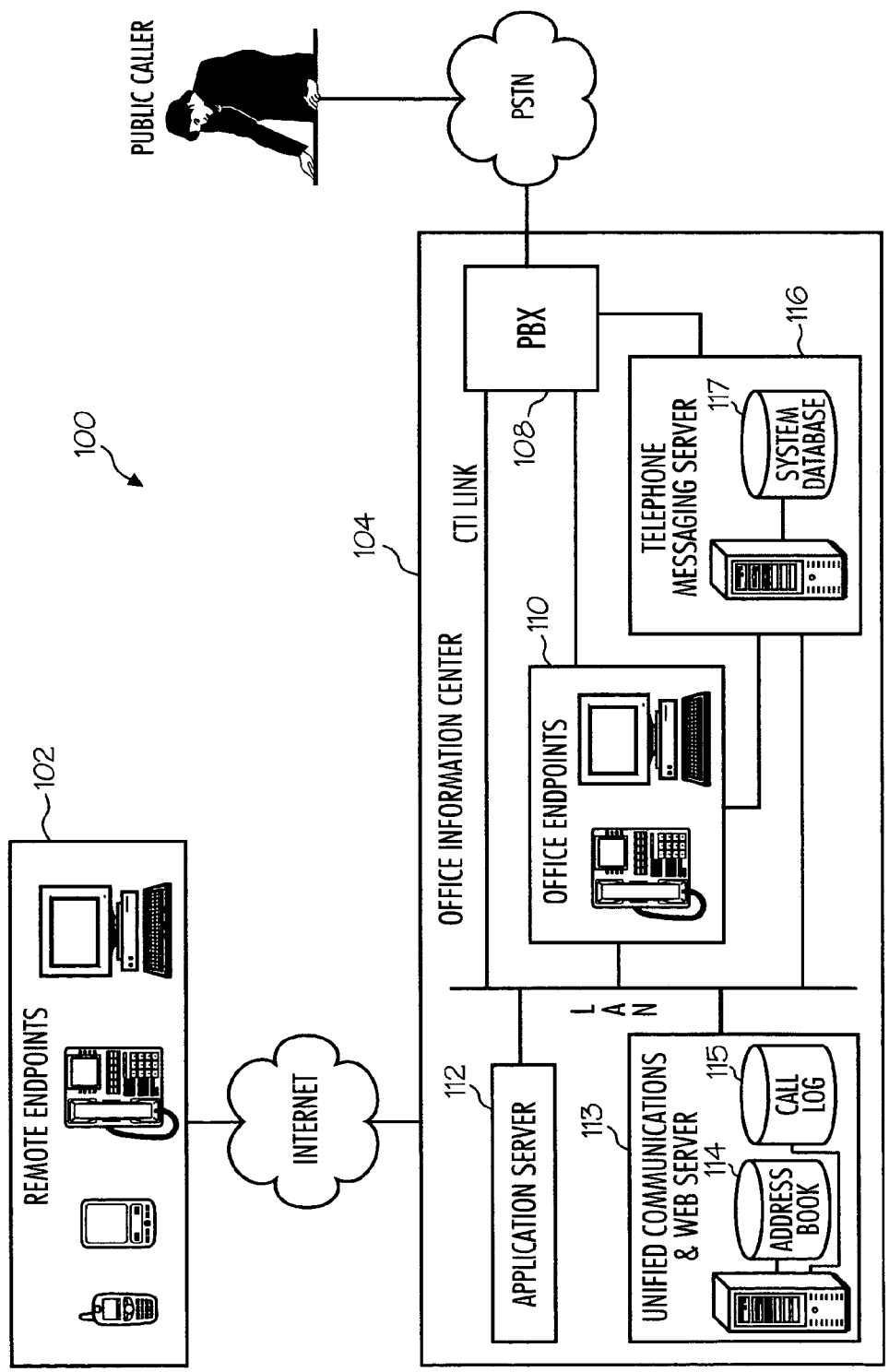
FIG. 1 illustrates an exemplary system for real-time call log status in accordance with various embodiments.

FIG. 1 illustrates an exemplary real-time call log status system 100 in accordance with various embodiments. Exemplary network or system 100 includes an office information center 104. Office information center 104 generally includes a PBX system 108 (private branch exchange), one or more office endpoints 110, an application server 112, a unified communications and web server (UCS) 113, and a telephone messaging server (TMS) 116. In addition, office information center 104 may include any necessary connections, data routing facilities, ancillary apparatus, network infrastructure, and the like normally associated with a communications network. In the illustrated embodiment, a LAN (local area network) interconnects the office information center and facilitates coupling to outside connections and a CTI link connects PBX 108 to the LAN.

Used herein, "endpoints" may include any communication device such as telephones (stationary and portable), keysets, personal computers, computing devices, personal digital assistants, pagers, wireless remote clients, messaging devices, and any other communication device capable of transmitting and receiving communication signals. Endpoints generally include an input or control means and a display.

Office information center 104 includes one or more office endpoints 110. In one particular embodiment, office endpoint 110 is an office workstation associated with a keyset. The office workstation may include a computing device, such as a stationary or portable personal computer having a memory, database, display and input means. The workstation is preferably coupled to the keyset (e.g., a multi-function desktop telephone) so communication and status information is available on either unit. In another embodiment, office endpoint 110 is a multimedia endpoint, for example, the Inter-Tel® Model 8690™ endpoint. While a user is in the office, office endpoint 110 may be in communication with various other systems within office information center 104. For example, each office endpoint 110 may be in communication with PBX 108, TMS 116, and UCS 113.

In one particular embodiment, one or more remote endpoints 102 communicate with office information center 104. Remote endpoints 102 include the same types of endpoints as previously described, but typically are off-site or remotely located from office information center 104. Examples of remote endpoints include, but are not limited to, cellular phones, PDAs (personal digital assistants), personal computers, keysets, and other devices that may be adapted to take calls and messages when users are away from the office. In one embodiment, remote endpoints 102 include a display, input or control means, and a web or microbrowser with suitable hardware and/or software to effectuate connection to the Internet. It should be appreciated that, although not shown or described, additional connections, links, adapter interfaces and networks may occur between the remote endpoints, the Internet, and office information center, e.g., a cellular base station.

As illustrated in the current embodiment of FIG. 1, the communication channel between the remote endpoints 102 and the office information center 104 may be the Internet, or the equivalent. In addition, the illustrated embodiment includes incoming and outgoing calls to office information center 104 received over a standard PSTN (public switched telephone network). In this manner, calls made to endpoints 110 or 102 over the PSTN may be received and routed by PBX 108.

PBX system 108, or the equivalent, may include various interfaces as needed for communication within the office information center, the Internet, the PSTN, and other wired or wireless networks. PBX systems, software controlled switches or hybrid telephone systems are generally well known and provide telephone and messaging services as needed to multiple office users and their endpoints. Provided services typically focus on the delivery of external and internal telephone calls to a commercial business. In general, PBXs are office-based telephone exchanges having special functions directed towards business users. Similarly, the PBX is any customer-owned switching apparatus that is used to connect real-time voice or multimedia communications from user-to-user (or endpoint-to-endpoint) regardless of the technology employed, such as time division multiplexing, packet switching, optical switching, pulse code modulation, internet protocols, ATM, or any combination thereof. Modern PBXs also provide integrated voice mail (e.g., in combination with telephone messaging server 116), hands free intercom calls, call center functions, complex system networks, and additional features using external computer control.

Application server 112 generally includes hardware and/or software to authenticate the user and maintain a partial directory service for the users. Additionally, application server 112 may include various other applications stored thereon used to facilitate connection, control, and retrieval of messages and other communication functions in accordance with the invention. In one aspect, application server 112 includes a directory service for the network users that may contain numbers and/or devices that are not typically associated with the network, such as mobile numbers.

Telephone messaging server 116 (TMS) includes hardware and/or software configured to work in conjunction with PBX 108 for the management of communication messages. A system database 117 couples to TMS 116 for the storage of messages intended for users within a network. Database 117 also contains address directory information, such as names, telephone numbers, extensions, and contact information, for the users in the network.

Unified communications and web server 113 (UCS) includes hardware and/or software configured to monitor events from endpoints, and manage and display messages for users within the network. UCS 113 is further configured to provide a visual description of messages (i.e., cause the display of the message's envelope) and similar functions on a display of an endpoint. In this manner, there is a communication link between UCS 113, TMS 116, application server 112 and PBX 108. The operations associated with a unified communications server are generally known in the industry and therefore will not be discussed in detail. However, the particular details of the invention as it pertains to the UCS will be described.

UCS 113 provides web server capabilities for office information center 104. The web server presents readable data to endpoints typically in a web-page format. A typical web page may include HTML documents, various forms, Java applets, Javascript, active server pages (ASP), common gateway interface scripts (CGI), extensible markup language (XML), dynamic HTML, cascading style sheets (CSS), help applications, plug-ins, and the like. In one particular embodiment, the system and method utilizes the Internet as an accessible and widely available communication channel to receive real-time call log status information. In this manner, any device that is capable of logging into a web page format as provided by the UCS can participate in the system.

UCS 113 includes an address book database 114 and a call log database 115. Address book 114 stores a unified listing of all devices or endpoints in the network (i.e., includes information from various sources, such as TMS 116 and application server 112). Initially, address book 114 may be populated with names, numbers and other information on file with PBX 108 and/or TMS 116. Each user may also have a personal address book or contacts list (i.e., storage) that they can fill with information from the PBX system directory or with personal contact information. In addition, users may set up personal address book entries for endpoints that are not directly connected to PBX 108. These types of endpoints include, but are not limited to, one or more remote endpoints 102 such as those previously described. As information is added to the address book more contact information is available to other users.

Call log database 115 stores call records of traffic originating from and terminating at each system endpoint. The call records appear as entries on the call log. Initially, the database may be empty but it quickly becomes populated with call records. Call records may be stored for each associated user and associated endpoint on the system. The call record includes various fields of data such as, but not limited to, type-of-call, date and time of call, name and/or number, result of the call, and an option to return the call. In accordance with the various embodiments, in addition to the above fields, the call record includes the current status of the user and/or endpoint.

Figure 2:

FIG. 2 illustrates an exemplary call log 200 in accordance with various embodiments of a real-time call log status system. Call log 200 may be viewed on any suitable display of a communication device or associated device, such as the above described endpoints 110, 102. As communication events occur for a particular user and/or endpoint, the system records data pertaining to the event in a suitable database, e.g., call log 115. In one particular embodiment, the communication events appear as entries on the call log. Entries may be displayed in a table format from the most recent event to the oldest. For example, call log 200 displays events occurring from June 17 at 03:41 pm to some earlier date in descending order. Although only a few entries are viewable on the display, such as the display of call log 200, it should be realized that many more are included and can be viewed, for example, by using a scroll function. The number of entries displayed and/or stored for a particular user may be determined by a system administrator and typically depends on the system-wide available storage. In other embodiments, the user may select a sort function and choose to have the entries displayed in various other formats other than by descending date, e.g., by name and number or by call result.

The exemplary call log 200 includes the date and time of the communication event, the name and/or number corresponding to the event, and the result of the event. In addition, each event may include one or more visual icons to, for example, represent the type of event and the current status of the name/number associated with the event. For instance, the first entry of illustrative call log 200 is to "Jill Black x123." On either side of the date and time of this event there is an icon. To the left of the date is a telephone icon to indicate this was an outgoing event, and to the right of the time is a handset icon to indicate the real-time status of "Jill Black x123" is available. Additionally, the telephone icon includes an "X" which further indicates that the communication was "unanswered" as included in the "Result" column. As another example, the next entry is to "Tom Neil x309." The left-most icon is a handset to indicate this was an incoming event and the icon next to the name/number indicates the real-time status of "Tom Neil x309" is unavailable. It should be appreciated that the icons illustrated and described herein are merely for exemplary purposes only and by no means represent the only types or kinds of icons that may be used. Rather, what should be realized is that the use of icons, and not necessarily the actual shape of the icon, as well as words to display the particulars about a communication event offers the user multiple techniques to gather information about the event.

The name/number column of illustrative call log 200 displays the name and number of the caller or called party, if known. The system attempts to match the name and/or number of the event with the user's address book, and maybe even a system-wide address book, and if a match is found, then the name may be displayed. In other embodiments, caller ID information may be present to provide the name/number for display and thus a system match may not be necessary. In one particular embodiment, the name/number may represent a facsimile and its corresponding fax number.

The result column of illustrative call log 200 displays the result of the event for both incoming and outgoing events. Results may include, but not limited to, missed, answered, answered at <xxx>, unanswered, transferred to <xxx>, and voicemail. In addition to the descriptive words in the result column, other embodiments may include an icon representation of the result of the event. For example, as described, an icon may be used to display the type of call, i.e., incoming or outgoing. As illustrated in call log 200, the type of call icon also includes another indication, such as an arrow ("transferred") or letter ("voicemail"), which may be used to display the result of the event.

Additional details of the event may be viewed by selecting the "+" icon for the desired entry. With combined reference to FIG. 3, the entry for "Tom Neil x309" is expanded to display the event details 302. In this particular embodiment, the event details include several lines below the entry showing the steps the system took to place the communication between x309 and x291. Various other event details may also be displayed in addition to or in lieu of the system steps. To collapse the event details, the user may select the "−" icon and call log 200 returns to the condensed table as illustrated in FIG. 2.

Another embodiment of the real-time call log status system may include the option to add a call log entry to the user's address book. This feature allows the user to select one or more entries from the call log and then select the "Add to Address Book" button to create a contact in the user's address book. The data is stored in the user's address book, such as address book 114, for future retrieval. In another embodiment, a communication may be received (or placed) from someone in the user's address book but from an unknown number. The system may perform a match and recognize the name of the party but not the number. The system may optionally flag the call log entry to alert the user that the system identified the name but not the number as belonging to a contact in the user's address book. In a similar manner, the system may flag an entry if the number but not the name is matched. The user can then choose to update the personal address book if needed.

Typically a user's call log includes a finite number of entries. In this manner, as new entries occur, the oldest entries are removed by the system. These removed entries may be archived for future retrieval or permanently deleted, depending on the particular needs of the user or system. Another option may be the ability for the user to delete one or more entries. The user can select the entry(s) from the call log and select a "Remove Entry" button and the entry will be archived or permanently deleted, depending on the particular system configuration.

Another feature of the real-time call log status system is the ability for the user to place a call directly from the call log. In one embodiment, the user selects a hyperlink (e.g., the "x123" next to "Jill Black" in call log 200) and the system places the call or communication. Advantageously, a real-time call log status system in accordance with various embodiments permits the user to view the real-time status of the name/number of the entry prior to placing the call. For instance, the entries on the user's call log include the current status of the name/number of the entry and are system-updated in real-time as the status changes. At a glance, the user can determine from the call log if the name/number from the entry is currently available or unavailable to receive a communication. The name/number may include a fax machine and the current status indicator may include the availability of the fax machine and/or fax number to receive a fax communication.

In one particular embodiment of a real-time call log status system, an icon is displayed to indicate the current status of the entry. For example, the entry of "Jill Black x123" of call log 200 displays a handset icon next to the name/number to indicate the entry is available to receive communications. In some instances, the system may be unable to determine the current status of an entry due to system failures and the like. In these cases, an icon, for example "?", may be displayed to inform the user that at the time of the update, the status of the name/number is unknown.

In another embodiment of a real-time call log status system, the user may perform an action to obtain the current status. For example, the user may move a cursor, or the like, over the entry to cause a pop-up script. The script may indicate the real-time status, such as "Available", "Unavailable", "Leave Voice Mail", etc. In one particular embodiment, the user may view an icon to see the real-time status (e.g., "Unavailable") and hover over the icon to view a pop-up script containing a detailed status (e.g., "Out-To-Lunch"). The script may include additional information and options, such as "find me" and "leave message" functions and/or additional contact numbers.

Figure 4:
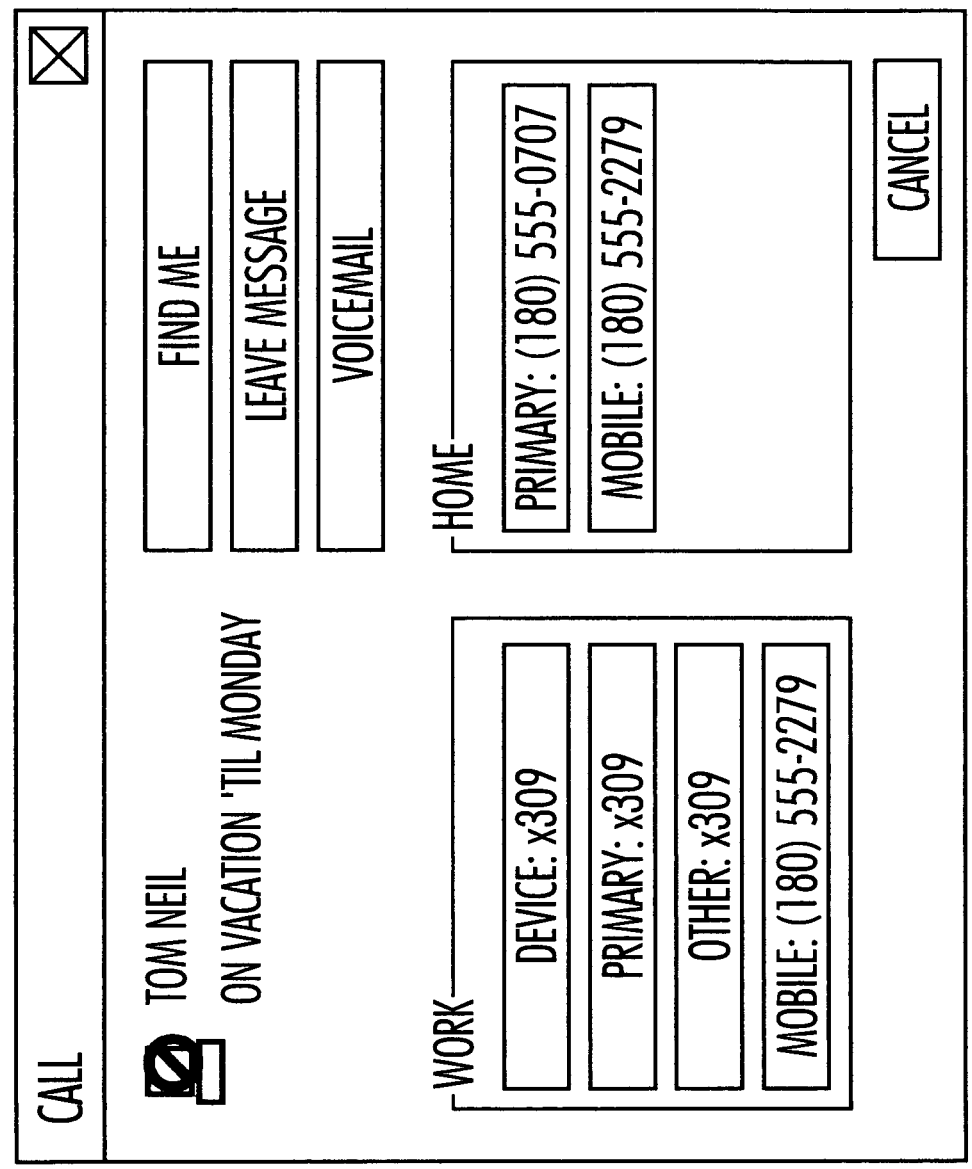

In yet another embodiment of a real-time call log status system, a pop-up window of current status information may appear, for example, as a result of the user actively clicking on the entry. FIG. 4 illustrates an exemplary pop-up window 400 of detailed current status information pertaining to the second entry, "Tom Neil x309" of call log 200. Pop-up window 400 may provide the user with additional information on the real-time status of the selected entry, such as the specific reason of unavailability. In the illustrative embodiment, Tom Neil x309 is unavailable and more specifically, "On Vacation 'Til Monday." In one particular embodiment, the call log may include an icon representing the current state, e.g., unavailable, and the pop-up window may include the detail information on the current state, e.g., on vacation. Pop-up window 400 may further include optional features in accordance with presence management including, for instance, find me, leave message, voicemail, and optional contact numbers.

In still another embodiment of a real-time call log status system, a pop-up menu table of current status information may appear, for example, as a result of the user actively clicking on the entry or moving over the entry. FIG. 5 illustrates an exemplary pop-up menu table 500 of detailed current status information pertaining to the second entry, "Tom Neil x309" of call log 200. Similar to pop-up window 400, pop-up menu table 500 may include the particular reasons for unavailability and offer the user additional presence management options.

Additional aspects of a real-time call log status system will be discussed below. It should be realized that the following description is not intended to be limiting but rather to provide a description of various embodiments and a best mode of operation. It should be appreciated that additional steps may occur that are not represented on the following flowcharts but are discussed in the conjoining text or elsewhere herein. Moreover, there may be operations, functions, routines, and the like that are not depicted on the flows or elsewhere but are well understood in the industry as common actions for a telecommunications system. Finally, unless specifically stated, the order of the depicted and described operations is not limited to the description.

Figure 6:
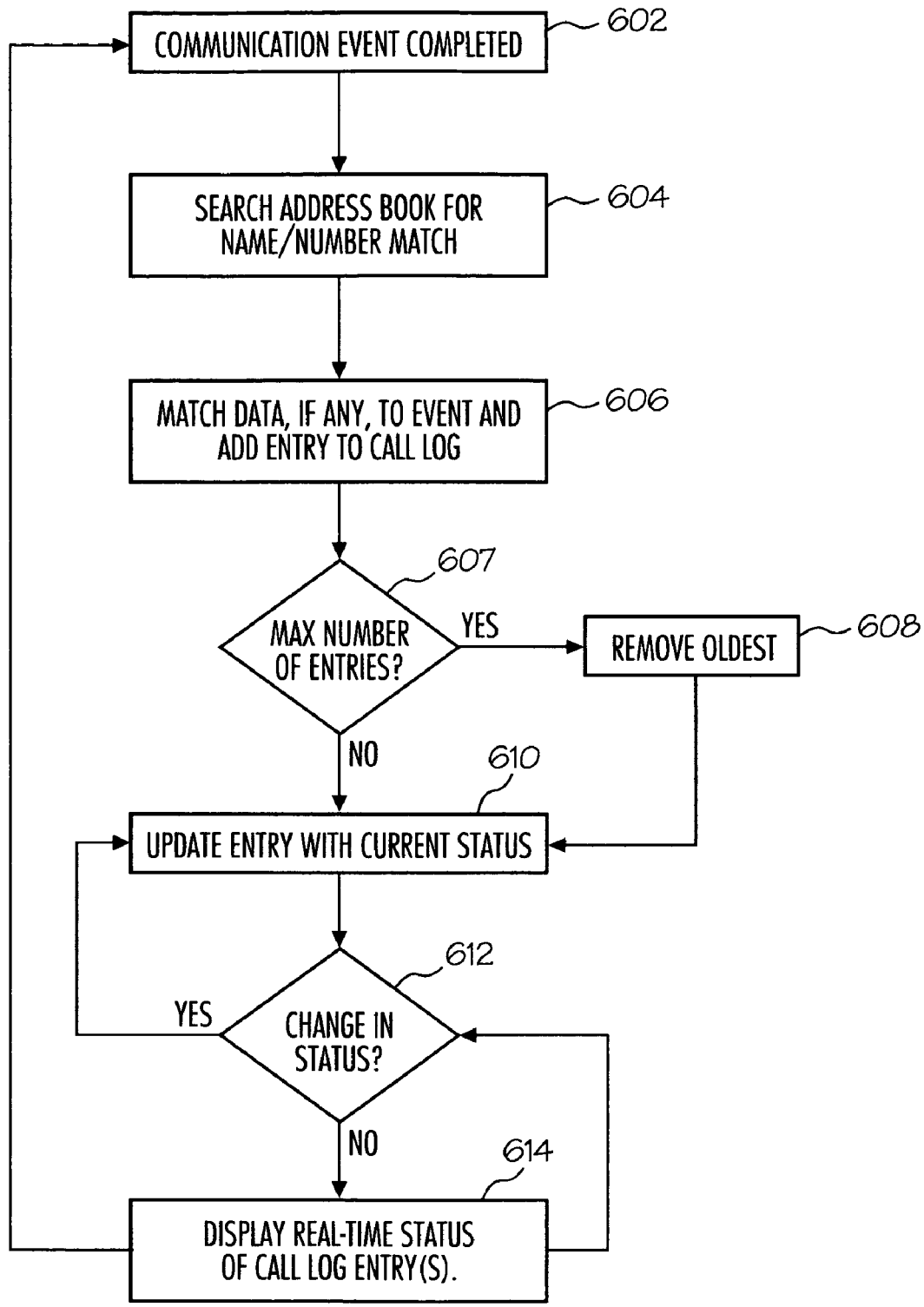
FIG. 6 is a flowchart of exemplary operations of a real-time call log status system.

FIG. 6 is a flowchart of the operation of a real-time call log status system (e.g., exemplary system 100) in accordance with one embodiment. Upon completion of a communication event (step 602), the system records the data pertaining to the event and determines if any of the participating parties have an established call log. For purposes of this disclosure it is assumed that the user has an established call log, even if there is no entries. The system attempts to match the name and/or number of the event with the user's personal address book, if any (step 604). If the user does not have an address book or if no match was found, the system may perform a system address book search to match the name and/or number (step 604). If a match of any of the information was found, then the system will substitute or append the name and number of the personalized contact to the event and add the entry to the user's call log (step 606). If no match is found, then the available data will be used as the entry in the call log (step 606).

In one particular embodiment, the call log displays a finite number of entries. One aspect of this embodiment includes displaying the most recent entries. As such, the system may perform a query to determine if the maximum number of entries for the user has been reached (step 607). If the system determines that an entry should be removed, in this particular embodiment the oldest entry (i.e., earliest dated entry) is removed (step 608). Of course, other criteria may be used to control the list of entries, e.g., number of entries for a particular name/number and results.

In accordance with the real-time call log status system of the disclosure, the entry(s) on the call log are maintained with the current status. The entry includes the current status, such as the availability to receive communications (step 610). It should be appreciated that a reference may be made to another location (i.e., database or the like) to retrieve the status information at the time of the display. In one particular embodiment, the name/number of the entry may be part of a larger system and as the name/number enters an unavailable or available status, the system records the change. The system may continuously monitor the statuses of the users and in response to a change in the status (step 612), update the appropriate call log entry(s) (step 610). In other embodiments, the system detects a change in status (step 612) as it occurs and responds to change by updating the appropriate call log entry(s) (step 610).

Upon selection of the call log function by the user, the system displays the user's call log on an appropriate endpoint or device (step 614). The call log includes the real-time statuses of each call log entry for the user, thus the user can determine at a glance if the name/number of the entry is available to receive an impending communication.

Presented herein are various systems, methods and techniques for real-time call log status, including the best mode. Having read this disclosure, one skilled in the industry may contemplate other similar techniques, modifications of structure, arrangements, proportions, elements, materials, and components that fall within the scope of the present invention. These and other changes or modifications are intended to be included within the scope of the disclosure, as expressed in the following claims.

The invention claimed is:

1. A communications call log system comprising:
    an address book database comprising a plurality of information comprising stored names and stored contact numbers;
    a call log database comprising a plurality of call records, each of the call records representing a transpired communication event between a user and another participant;
    a displayable call log comprising one or more entries, each entry displaying a plurality of data pertaining to one of the call records, if the participant is one of the stored names or stored contact numbers from the address book database then the data includes the stored information pertaining to the participant;

a first status indicator displayed for each entry on the call log, the first status indicator comprising a graphical icon representing one of an incoming or an outgoing previous call;

a second status indicator displayed for each entry on the call log, the second status indicator comprising a graphical icon being automatically system-updated without user interaction as a status of the participant on the entry changes and representing a real-time telephony status of the participant, wherein the user views the real-time availability of the entry to participate in an impending voice communication event; and a third status indicator displayed for each entry on the call log, the third status indicator comprising a graphical icon representing a result of the transpired communication event.

2. The system of claim 1, wherein said status indicator further comprises one of a pop-up window or a pop-up menu, both being displayed by user action.

3. The system of claim 2, wherein said status indicator further comprises a pop-up window of detailed status information.

4. The system of claim 1, wherein said call log includes a finite number of entries and as recent entries are added older entries are deleted.

5. The system of claim 1, wherein said data pertaining to one of the call records further comprises a sequence of steps detailing placement of the transpired communication event.

6. The system of claim 1, wherein said entry includes a user-activated indicia to initiate an impending communication event from said entry.

7. The system of claim 6, wherein said user-activated indicia comprises a hyperlink.

8. The system of claim 1, wherein said entry includes a user notification if there is a partial match of said stored name and stored contact number.

9. A communications call log process for a user, the process comprising:

recording, in a retrieval memory, a plurality of data pertaining to a transpired communication event between an associated number of the user and another participant, the data including a number of the participant;

displaying, on a communication device, a call log comprising one or more of the transpired communication events;

displaying, on the device, a first status indicator comprising a graphical icon representing one of an incoming or an outgoing previous call;

displaying, on the device, a second status indicator comprising a graphical icon representative of the real-time telephony status of the number of the participant;

displaying, on the device, a third status indicator comprising a graphical icon representing a result of the transpired communication event;

detecting a change in telephony status of the number of the participant; and automatically updating the second status indicator without user interaction to reflect the change, wherein the user views the real-time availability of the number to participate in a telephony call.

10. The process of claim 9 further comprising matching the number of the communication event with an address book entry.

11. The process of claim 10 further comprising displaying the address book entry for the matched transpired communication event.

12. The process of claim 9, wherein the status indicator further comprises displaying a pop-up window.

13. The process of claim 10 further comprising displaying an alert if there is a partial match.

14. The process of claim 9 wherein recording data further includes recording a sequence of steps detailing placement of the transpired communication event and the sequence of steps being displayed on the device.

* * * * *